(12) United States Patent
Su

(10) Patent No.: US 8,342,558 B1
(45) Date of Patent: Jan. 1, 2013

(54) GLIDER HITCH FOR TRAILER FIFTH WHEEL

(76) Inventor: Austin Su, Wilmington, CA (US)

(*) Notice: Subject to any disclaimer, the term of this patent is extended or adjusted under 35 U.S.C. 154(b) by 0 days.

(21) Appl. No.: 13/337,786

(22) Filed: Dec. 27, 2011

(51) Int. Cl.
*B62D 53/06* (2006.01)

(52) U.S. Cl. ........................ 280/438.1; 280/441; 280/901

(58) Field of Classification Search .................. 280/433, 280/438.1, 439, 440, 441, 901; 74/503, 504; 403/322.3, 322.4, 324, 325
See application file for complete search history.

(56) References Cited

U.S. PATENT DOCUMENTS

| | | | | |
|---|---|---|---|---|
| 2,819,096 | A * | 1/1958 | Sencenich ..................... | 280/407 |
| 5,451,069 | A * | 9/1995 | Schueman ................. | 280/149.2 |
| 5,630,603 | A * | 5/1997 | Turner et al. ............... | 280/407.1 |
| 5,839,745 | A * | 11/1998 | Cattau et al. .................. | 280/434 |
| 6,682,089 | B2 * | 1/2004 | McCoy et al. ............. | 280/438.1 |
| 6,685,210 | B2 * | 2/2004 | Lindenman et al. .......... | 280/441 |
| 7,234,905 | B2 * | 6/2007 | Warnock ......................... | 410/80 |
| 7,984,920 | B2 * | 7/2011 | Alguera ..................... | 280/438.1 |
| 8,191,957 | B2 * | 6/2012 | Gosselin et al. ........... | 296/184.1 |
| 2002/0149171 | A1 * | 10/2002 | Linger et al. ................. | 280/441 |

* cited by examiner

*Primary Examiner* — Anne Marie M Boehler
(74) *Attorney, Agent, or Firm* — Fulwider Patton LLP

(57) ABSTRACT

A fifth wheel glider hitch is disclosed having a pair of sliding rails that support a fifth wheel assembly, the fifth wheel assembly sliding on the rails over first and second brackets that include a locking hole. The sliding rails each have apertures defining a forward position and a rear position, and the glider includes handle with a locking mechanism that traps the assembly in a forward or aft position.

9 Claims, 11 Drawing Sheets

GLIDER HITCH FOR TRAILER FIFTH WHEEL

BACKGROUND

A fifth-wheel trailer is generally a large, high profile trailer which is coupled to a large towing vehicle, such as a large pick-up truck or other suitable vehicle. The fifth-wheel trailer is typically coupled to the towing truck or vehicle using a fifth-wheel hitch or a ball hitch, which, in the case of many conventional fifth-wheel hitches, is typically mounted to the towing vehicle, such as to the frame of a truck, and is made to couple directly to the fifth-wheel trailer.

Sliding hitch assemblies may include a fifth wheel that is longitudinally movable relative to the towing vehicle. Such longitudinal movement of the fifth wheel assembly allows the fifth wheel and trailer kingpin received by the fifth wheel to be suitably positioned relative to the towing vehicle. For example, the fifth wheel may be located above the towing vehicle's rear axle for normal towing. However, the fifth wheel may be selectively displaced toward the rear end of the towing vehicle to allow for increased clearance between the towing vehicle and the trailer, which offers greater maneuverability such that the towing vehicle and trailer may perform a tighter turn due to the increased clearance.

SUMMARY OF THE INVENTION

The present invention is a glider hitch for a fifth wheel assembly that can slide the assembly along a pair of support rails, and then easily and quickly lock the assembly into position using a spring loaded locking pin. These, and other advantages of the present invention, will become apparent from the figures and the detailed description of the invention set forth below.

DETAILED DESCRIPTION OF THE PREFERRED EMBODIMENTS

The following detailed description of exemplary embodiments of the invention makes reference to the accompanying drawings, which form a part hereof, an in which are shown, by way of illustration, exemplary embodiments in which the invention may be practiced. While these exemplary embodiments are described in sufficient detail to enable those skilled in the art to practice the inventions, it should be understood that other embodiments may be realized and that various changes to the invention may be made without departing from the spirit and scope of the present invention. Thus, the following more detailed description of the embodiments of the present invention is not intended to limit the scope of the invention, as claimed, but is presented for purposes of illustration only and not limitation to describe the features and characteristics of the present invention, to set forth the best mode of operation of the invention, and to sufficiently enable one skilled in the art to practice the invention. Accordingly, the scope of the present invention is to be defined solely by the appended claims, using the ordinary meaning of the words therein.

Figure 1:
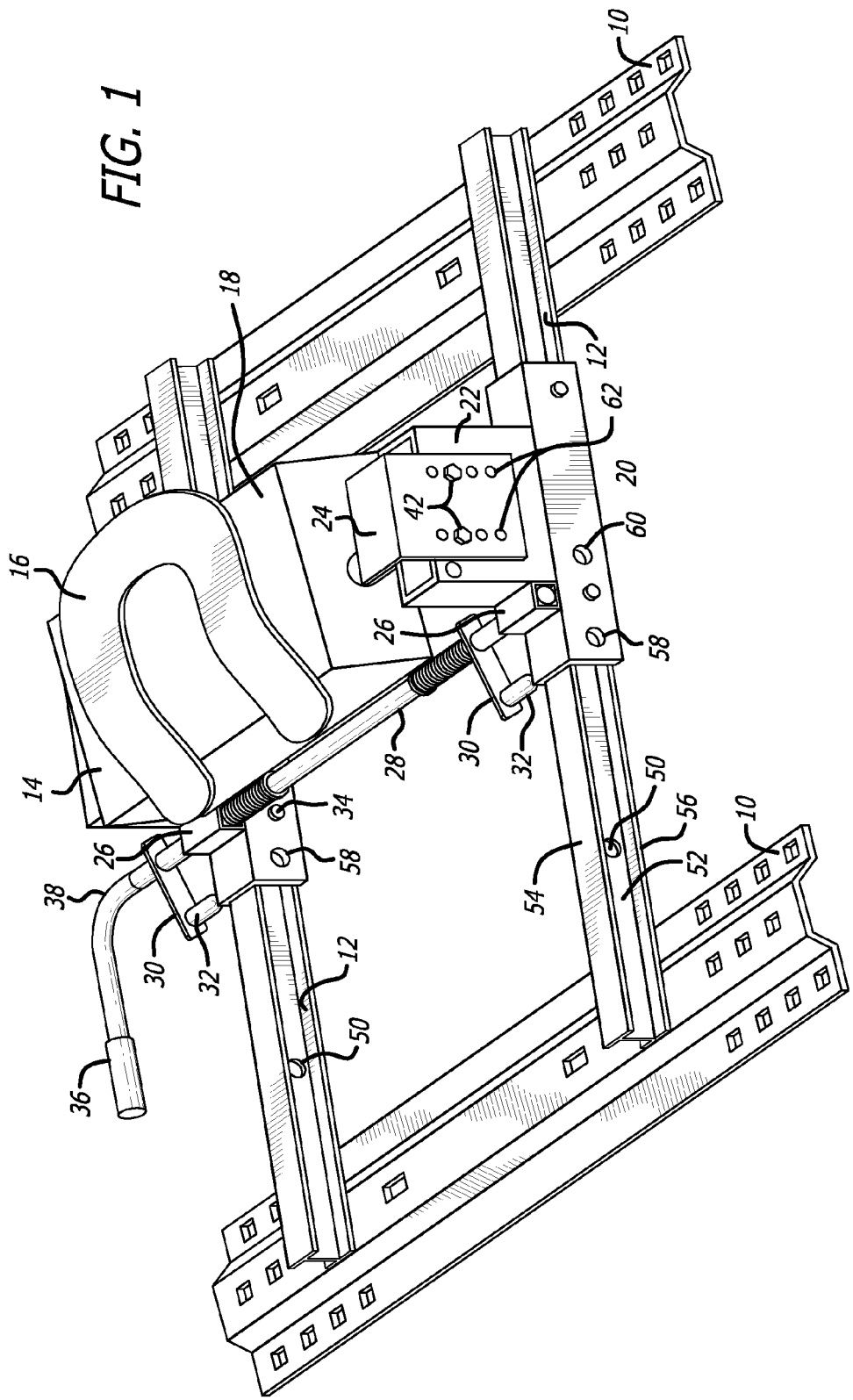
FIG. 1 is an elevated, perspective view of a glider hitch.
Figure 2:
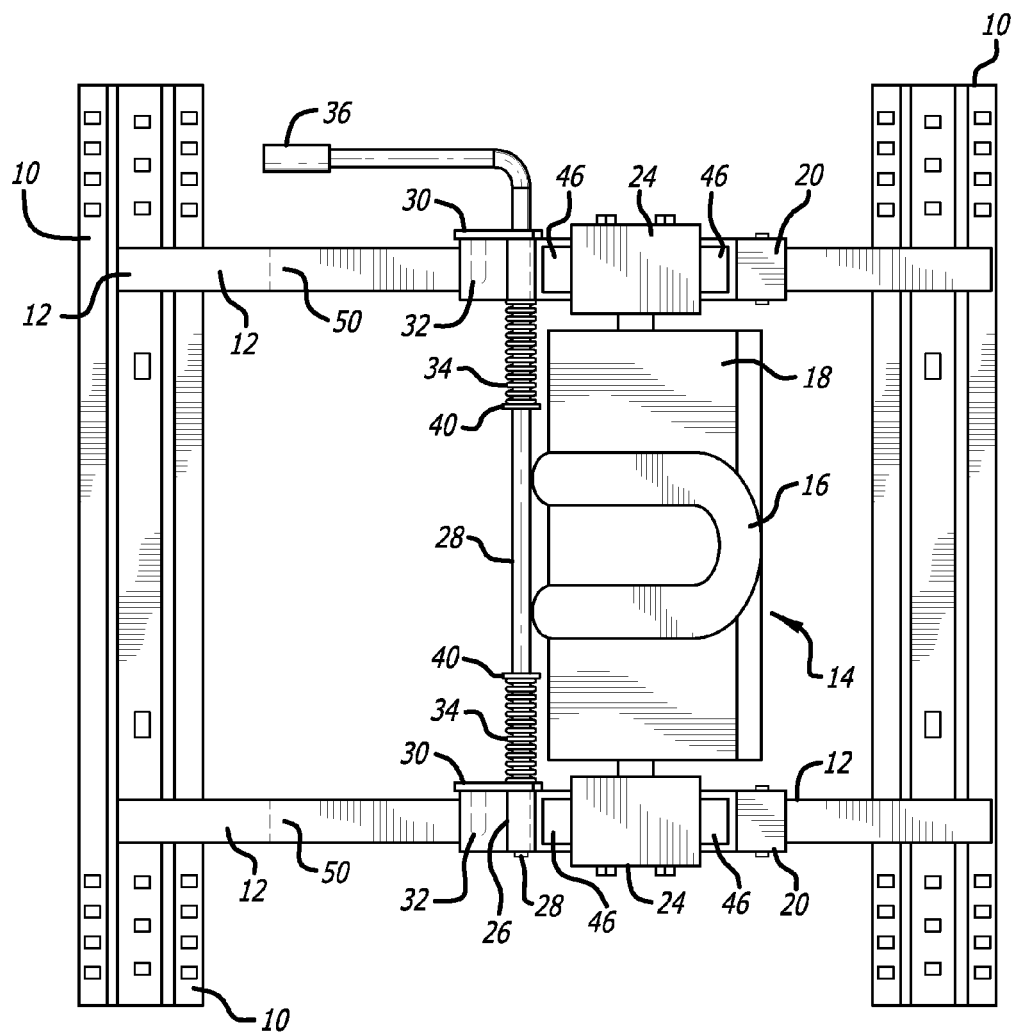
FIG. 2 is a top view of the glider of FIG. 1.

A first embodiment of a glider hitch of the present invention is generally illustrated in FIG. 1. FIG. 1 shows a pair of platform rails 10 which may be mounted, for example, to the bed of a pickup truck. The platform rails 10 alternatively may be mounted in any other configuration where it is convenient to mount the fifth wheel assembly. Secured on top of the platform rails 10 are a pair of slide rails 12 arranged in a parallel manner. Each slide rail 12 has an I-beam profile with an upper plate 54, a lower plate 56, and a central web 52. Each central web 52 includes a pair of first holes 48 and a pair of second holes 50 longitudinally spaced along the central web. The first pair of holes 48 are collinearly aligned, and the second pair of holes are collinearly aligned as well. As set forth more fully below, these holes are used to position the fifth wheel assembly.

Figure 6:
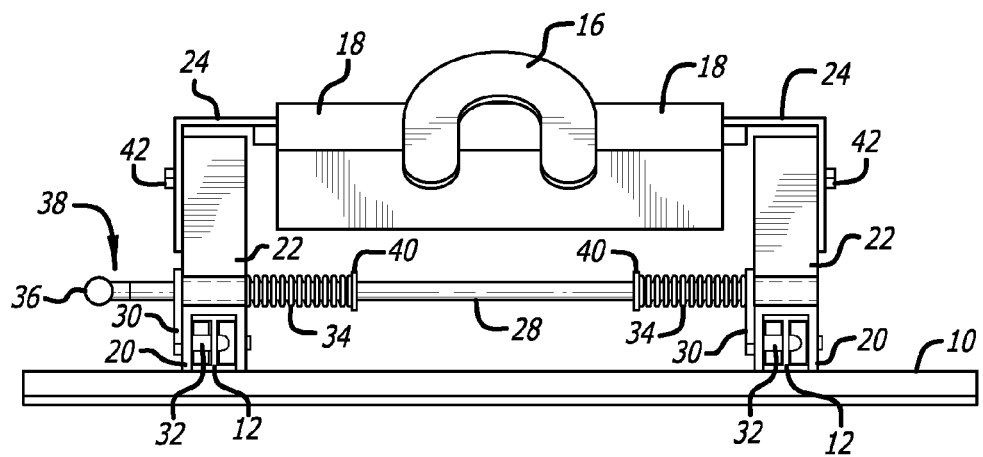
FIG. 6 is a front view of the glider hitch of FIG. 1.
Figure 7:
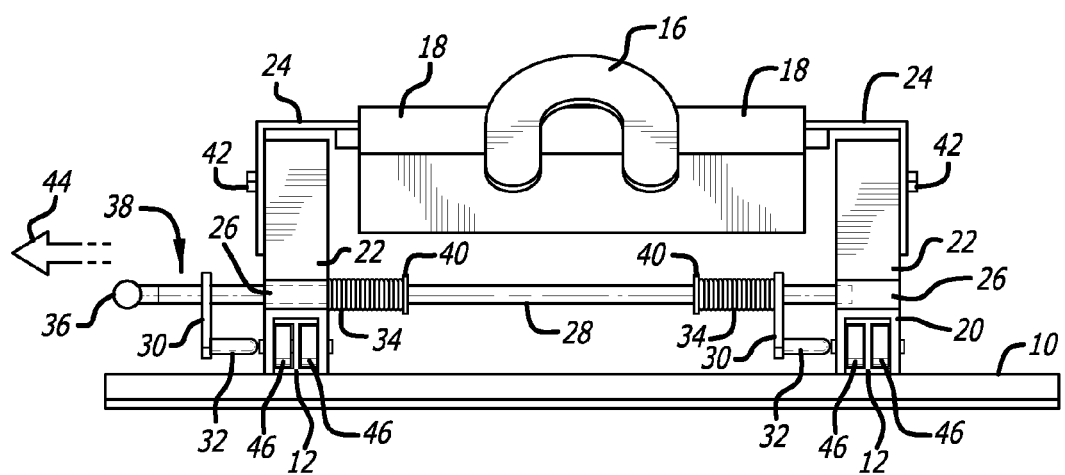
FIG. 7 is a front view of the glider hitch with the locking pin released.
Figure 8:
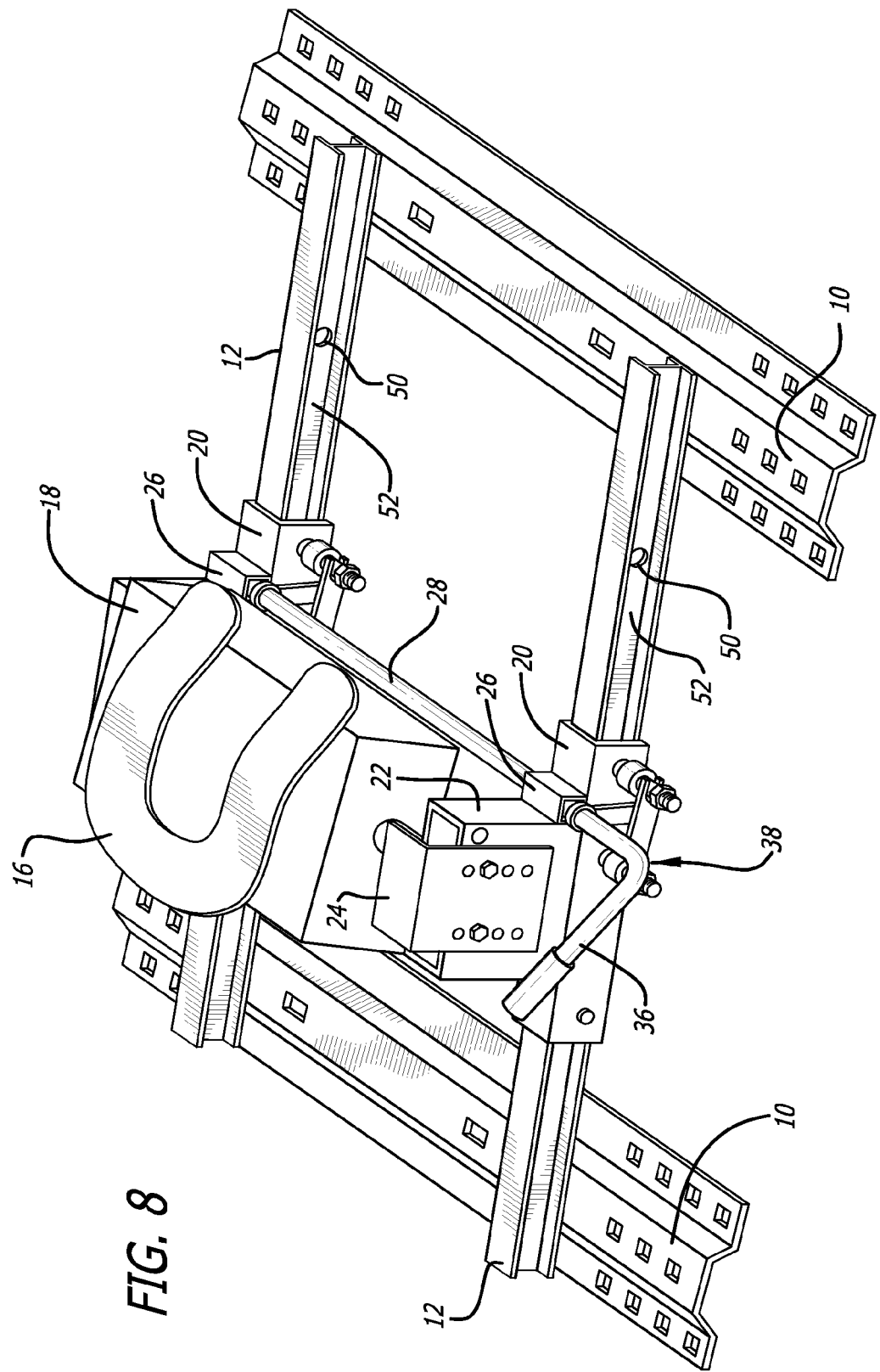
FIG. 8 is a perspective view of a second locking embodiment of the glider hitch.

A fifth wheel assembly 14 is mounted on the sliding rails 12, including a fifth wheel mount 16, a fifth wheel mount carriage 18, a pair of carriage mounting brackets 22, and a pair of slide rail brackets 20. The fifth wheel mount supports the fifth wheel, and is seated on the mounting carriage 18. The carriage mounting bracket 22 is seated on the slide rail bracket 20, which is fitted over the slide rails 12, as shown in FIGS. 6 and 7. Mounted within the slide rail bracket 20 is two pair of wheels 46 that ride within the enclosure of the I-beams and allow the fifth wheel assembly to glide along the length of the slide rails 12.

The mount carriage 18 is secured to the carriage mounting bracket 22 and slide rail bracket 20 via the cover plates 24 as shown in FIG. 7. A pair of bolts 42 passes through the cover plate 24 and into the carriage mounting bracket 22 to secure the fifth wheel assembly 14 to the respective brackets. By selecting the appropriate bolt holes 62, the height of the fifth wheel assembly 14 can be controlled and adjusted.

Figure 3:
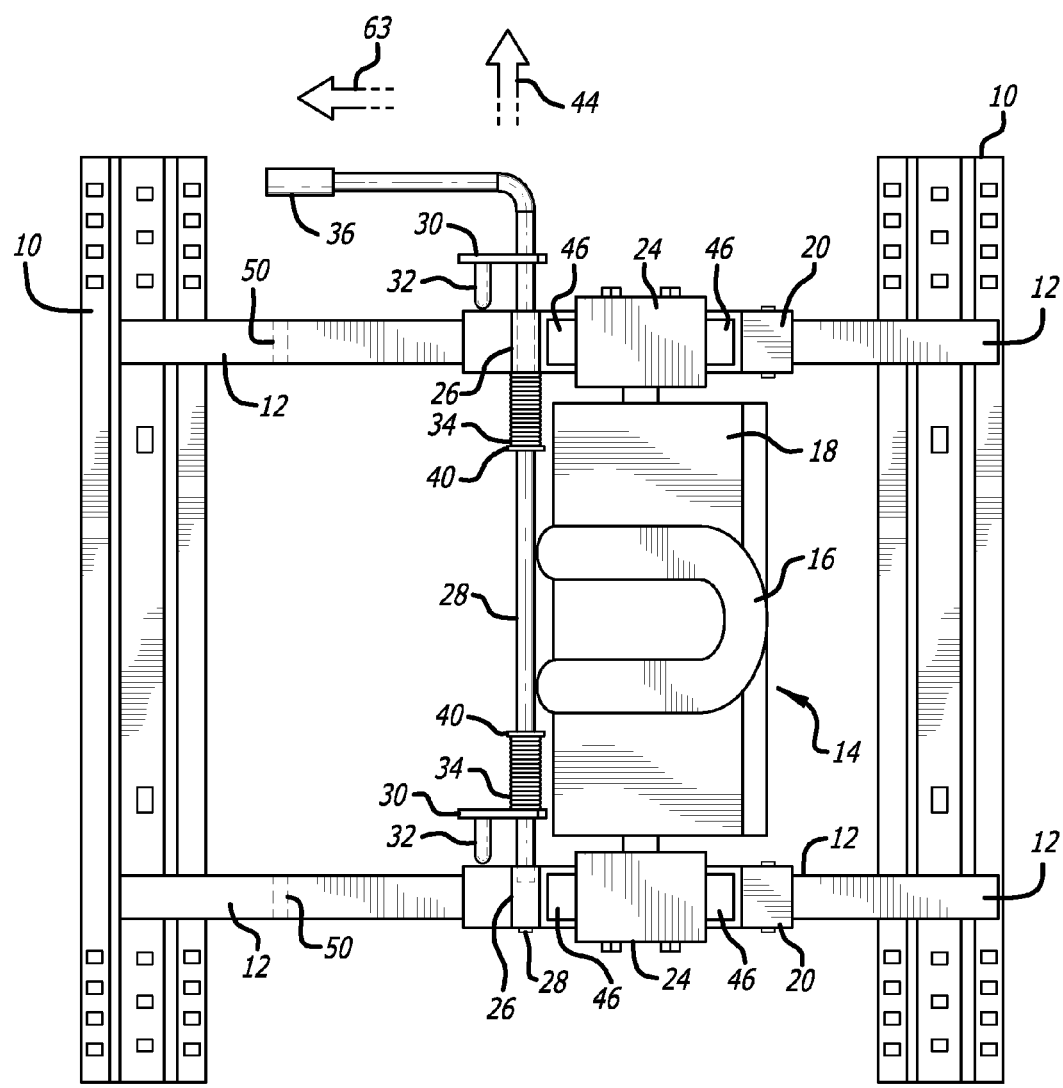
FIG. 3 is top view of the glider of FIG. 1 with the locking pin released.
Figure 4:
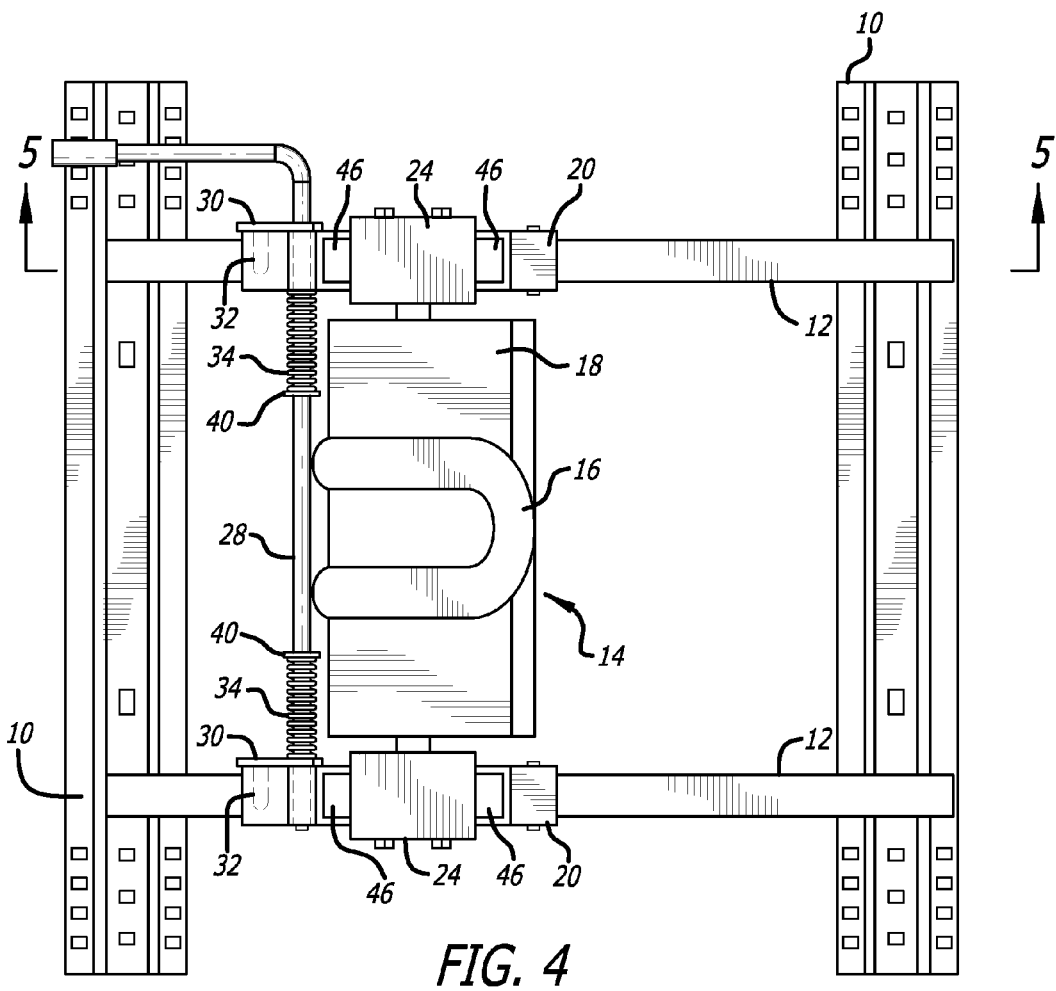
FIG. 4 is top view of the glider of FIG. 1 with the locking pin reinserted.
Figure 5:
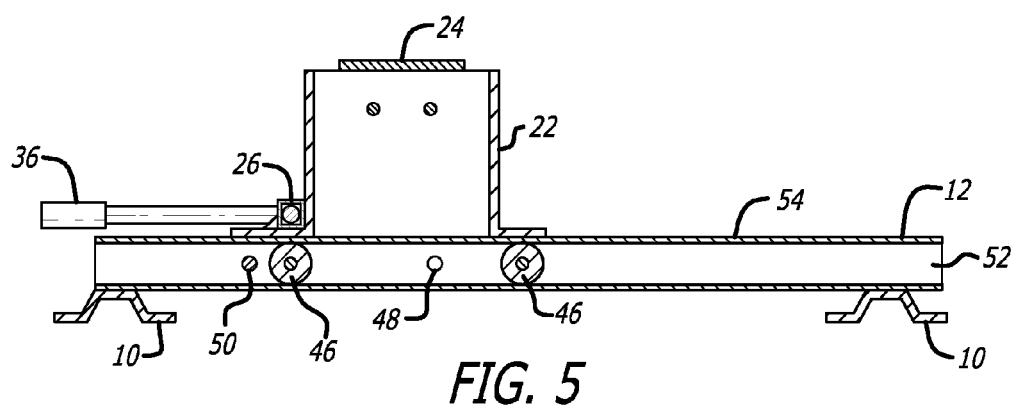
FIG. 5 is a side view of the glider hitch of FIG. 1.

At the juncture of the carriage mounting bracket 22 and slide rail bracket 20 is a rectangular sleeve 26 with a square profile. Each sleeve 26 is sized to receive respective ends of a locking rod 38, which is comprised of a position member 28 and a handle member 36. The position member 28 of the locking rod 38 can slide within the respective sleeves 26 in a direction traverse to the direction of the slide rails 12. Mounted on the position member 28 are a pair of plates 30, upon which is mounted a locking pin 32 oriented in the direction parallel to the position member 28. Also mounted on the position member 28 is a pair of springs 34 which are axially fixed by respective stops 40. As shown in FIG. 3, when the handle member 36 is pulled in the direction of arrow 44, each spring 34 is compressed by the stop 40 and the plate 30 or sleeve 26. When the handle 36 is released, the spring biases the lock rod back to a position where the locking pins 32 overlay the slide rails 12.

To lock the fifth wheel assembly in one of the two positions defined by the first pair of holes 48 and the second pair of holes 50, the handle member 36 is withdrawn in the direction of arrow 44 so that the locking pins 32 are free of the slide rails 12. In this position, the fifth wheel assembly mounted on the respective slide rail brackets with the help of wheels 46 can roll longitudinally along the slide rails in a free manner. To secure the fifth wheel assembly 14 in the first position, the holes 48 in the sliding rail central web 52 are aligned with holes 58 in the sliding bracket. If the handle member 36 is released, the locking rod 38 via the positioning member 28 is directed under the influence of the biasing springs 34 in a direction opposite to that of arrow 44. The locking pins 32 can pass through the holes 48 in the slide rail and the hole 58 in the bracket to prevent further longitudinal motion of the fifth wheel assembly 14. The springs 34 ensure that the locking pins 32 will remain in the holes 48 and holes 58 to lock the assembly in place. If more positions are desired, a second set of holes 60 in the slide rail bracket 20 can be used for more precise positioning of the fifth wheel assembly.

To move the fifth wheel assembly from the first position to the second position defined by the holes 50 in the slide rails 12, the handle 36 is once again moved in the direction of arrow 44 to cause the locking pins 32 to be withdrawn from the holes 48 and 58, respectively. The fifth wheel assembly 14 may then be glided along the slide rails 12 in the direction of arrow 63 as the wheels 46 ride within the I-beam members until the second set of holes 50 are reached. The handle member 36 is then released under the influence of the springs until the plates 30 are flush with the slide rail bracket 20 and the locking pins 32 are seated in the second set of holes 50 as well as the hole 58 in the slide rail bracket 12. Once again, the force of the springs 34 prevent the locking rod 38 from disengaging with the slide rails 12 and the slide rail brackets 20 to maintain the fifth wheel assembly in the desired location. In this manner, the fifth wheel assembly can be located quickly and reliably in a secure manner without any lifting or vertical movement of the fifth wheel assembly 14.

The present invention addresses the problem of safety pin dislodgement without impeding or hindering the function and operation of the spring clip/safety pin assembly. Although specific embodiments have been described, the scope of the present invention is properly defined by the appended claims without limitation to any specific embodiment or drawing used to illustrate the invention.

A second embodiment of the glider hitch of the present invention can be found in FIGS. 8-15. The glider hitch of FIG. 8 has a similar mounting configuration as the preceding embodiment, but a different locking mechanism. Namely, a fifth wheel mounting carriage 18 rides on a pair of slide rails 12, where the slide rails 12 have a first hole 48 and a second hole 50 corresponding to forward and rear positions on the slide rails 12. The carriage 18 is movable along the rails, but may be secured to either the forward position corresponding to holes 48 or the rear position corresponding to holes 50. A locking mechanism described below fixes the carriage 18 into the forward or rear position.

Figure 9:
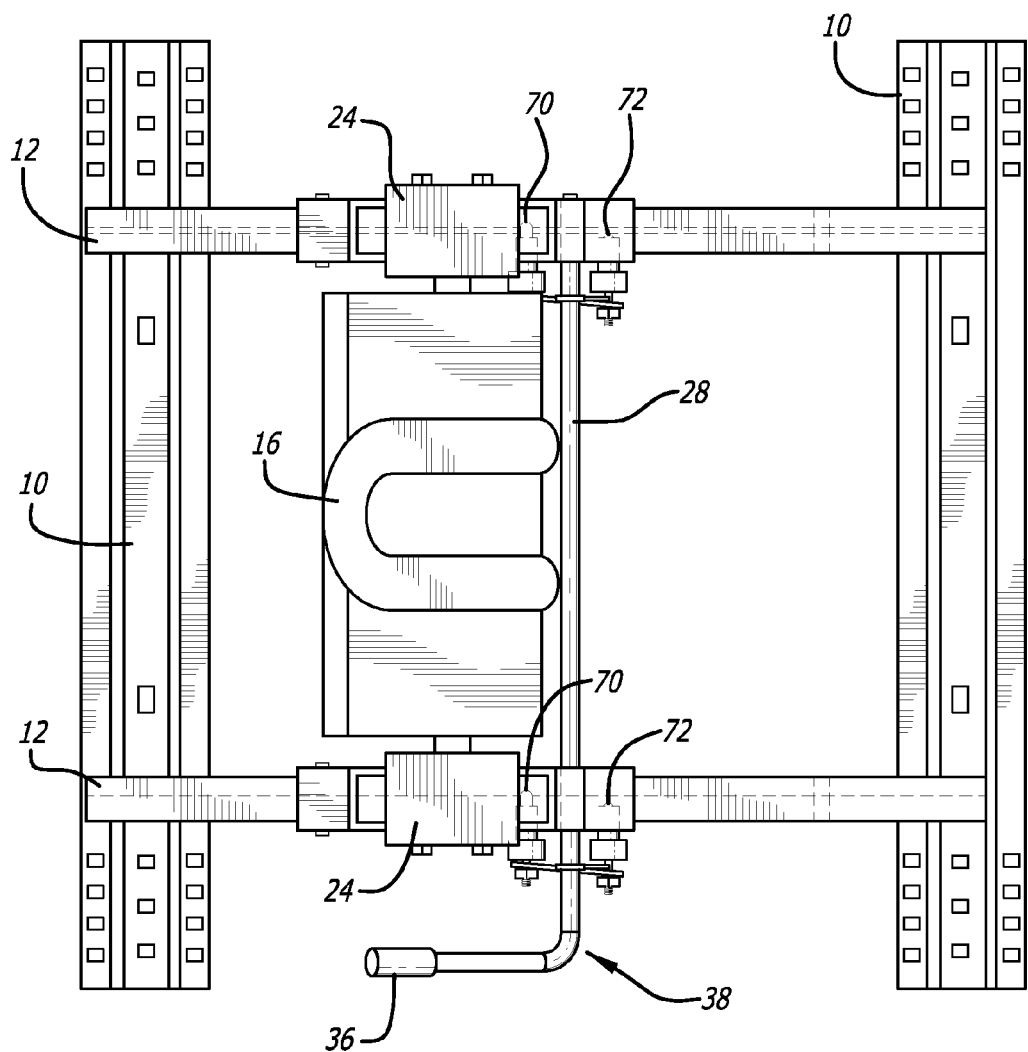
FIG. 9 is a top view of the embodiment of FIG. 8 in a first position.
Figure 10:
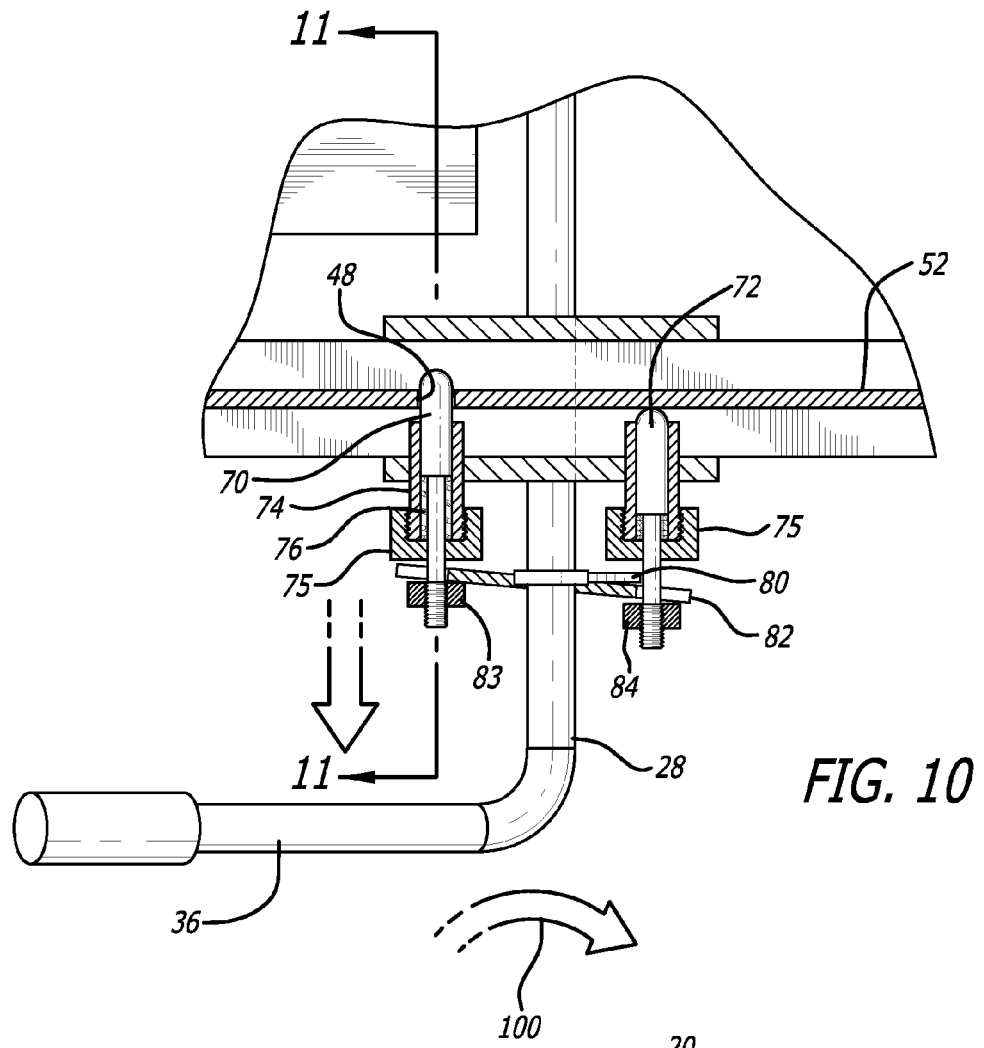
FIG. 10 is an enlarged, cross sectional view of the locking mechanism of the embodiment of FIG. 8.
Figure 11:
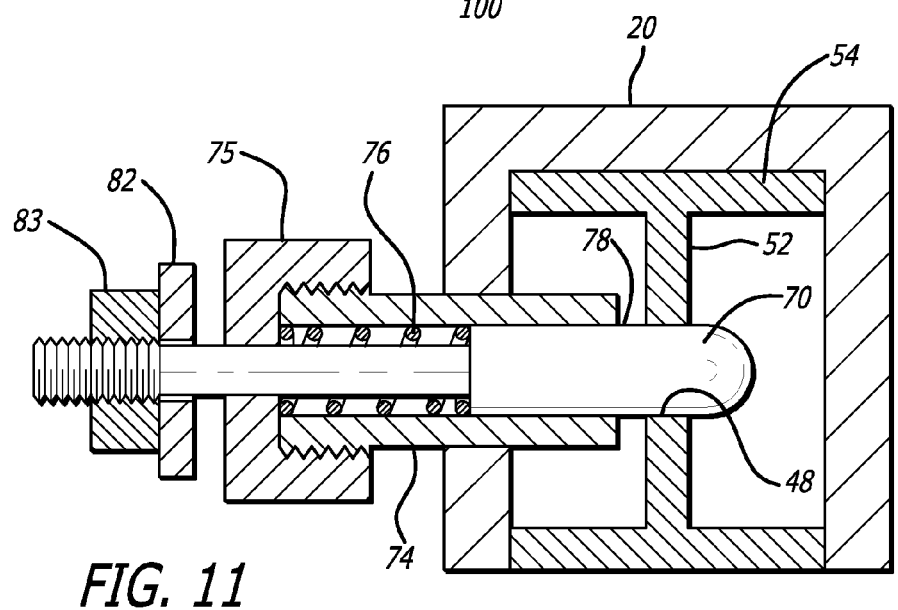
FIG. 11 is a cross sectional view taken along line 11-11 of FIG. 10.

FIG. 9 shows a top view of the carriage in the forward position, where a pair of spring actuated forward locking pins 70 are located in the forward holes 48 to lock the carriage 18 in the forward position. A second pair of spring actuated aft locking pins 72 are also shown in FIG. 9, which are shown bearing against the slide rails' central web 52. The operation of the spring actuated pins 70,72 is illustrated in FIGS. 10 and 11. FIG. 10 shows a handle 36 that can rotate as shown by arrow 100 between two positions, a forward position where the handle is pointed toward the left in FIG. 9 and a rearward position where the handle is pointed toward the right as in FIG. 12. Returning to FIG. 9, the proximal spring actuated pin 70 is shown passing through hole 48, whereas spring actuated pin 72 bears against central web 52. Pin 70 is biased away from a tubular housing 74 that is threaded into an end cap 75, by spring member 76, which urges the pin 70 through housing 74's uncapped opening 78. This set up is repeated at the opposite side of the carriage 18.

Figure 12:
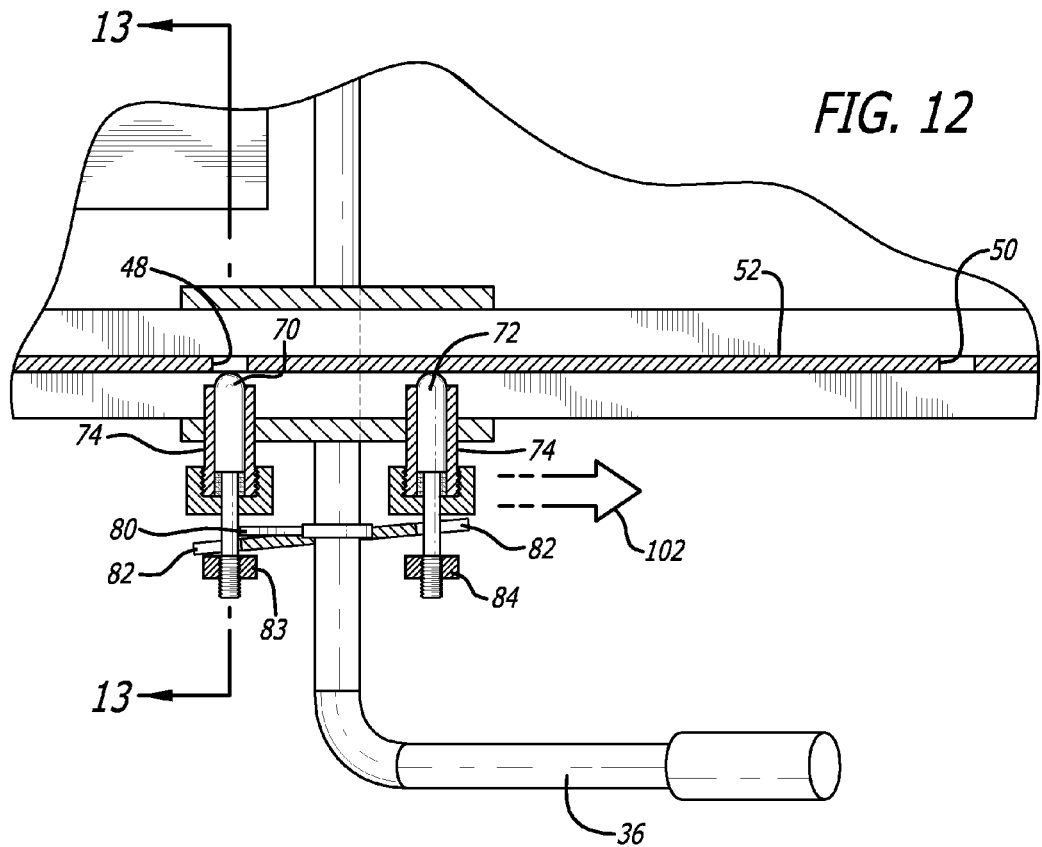
FIG. 12 is an enlarged cross sectional view of the locking mechanism of the embodiment of FIG. 8 in an unlocked state.
Figure 13:
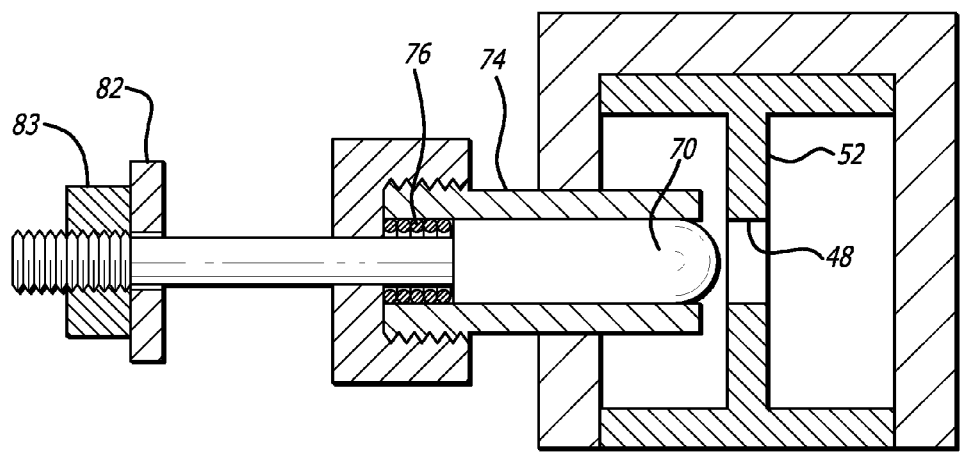
FIG. 13 is a cross sectional view taken along line 13-13 of FIG. 12.

With the pins 70 locked in holes 48 of the slide rails 12, the carriage 18 is prevented from sliding along the slide rails and the fifth wheel assembly 14 is fixed in the forward position. To move the fifth wheel assembly to the rear position, the handle 36 is rotated from the forward position shown in FIG. 12. The rotation of the handle 36 to the second position shown in FIG. 12 causes the pins 70 to be withdrawn into their housings 76, and the pins 72 to be released. This occurs because the handle's positioning member 28 includes a pair of levers 80 which are initially bears against a plate 82 that is mounted to both pins 70 and 72. When the handle 36 is in the position shown in FIG. 10, the lever 80 pushes plate 82 away from the slide rail 12, bearing against a lug 84 at the end of the pin 72. The pressure brought to bear by the plate 82 on the lug 84 overcomes the force of the spring 76 in the housing 74, forcing the pin to retract in the housing so that it cannot fully extend out of the housing 74. When the handle is rotated in the direction of arrow 100, the lever 80 swings across to the opposite side of the plate 82 as shown in FIG. 12. This movement of the lever 80 drives the plate 82 proximal to the pin 70 away from the slide rail, overcoming the force of the spring 76 as the plate 82 bears against the lug 83. This is shown in FIG. 13 (lever and plate omitted). At the same time, the pin 72 is released because the lever 80 no longer bears against the plate 82 proximal to lug 84, allowing the force of the spring 76 to push the pin 72 out of its housing. Thus, the pin 72 can fully extend when the handle is in the position shown in FIG. 12, but the presence of the web 52 prevents the pin 72 from fully extending.

Figure 14:
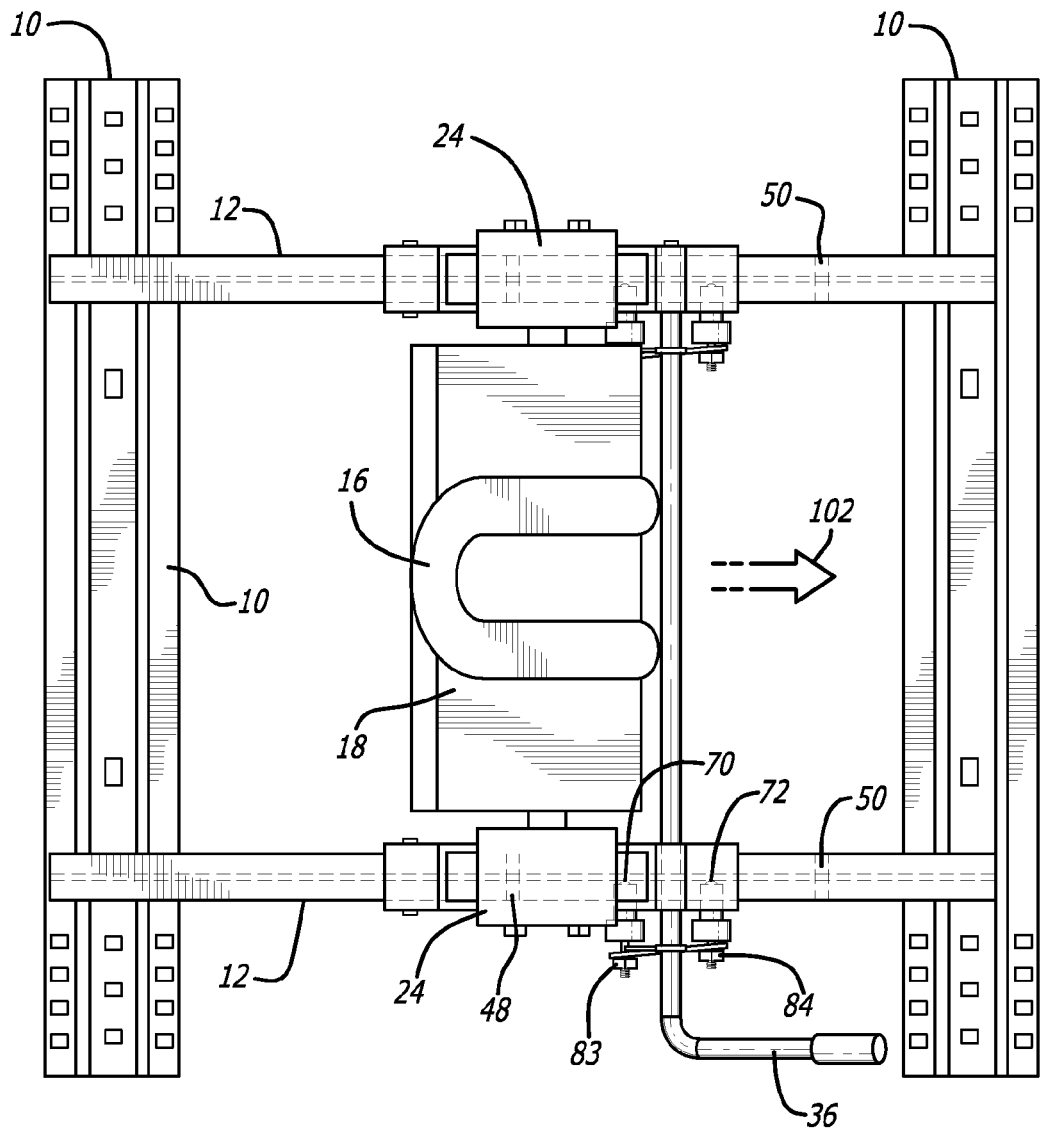
FIG. 14 is a top view of the embodiment of FIG. 8 intermediate between the two locked positions.
Figure 15:
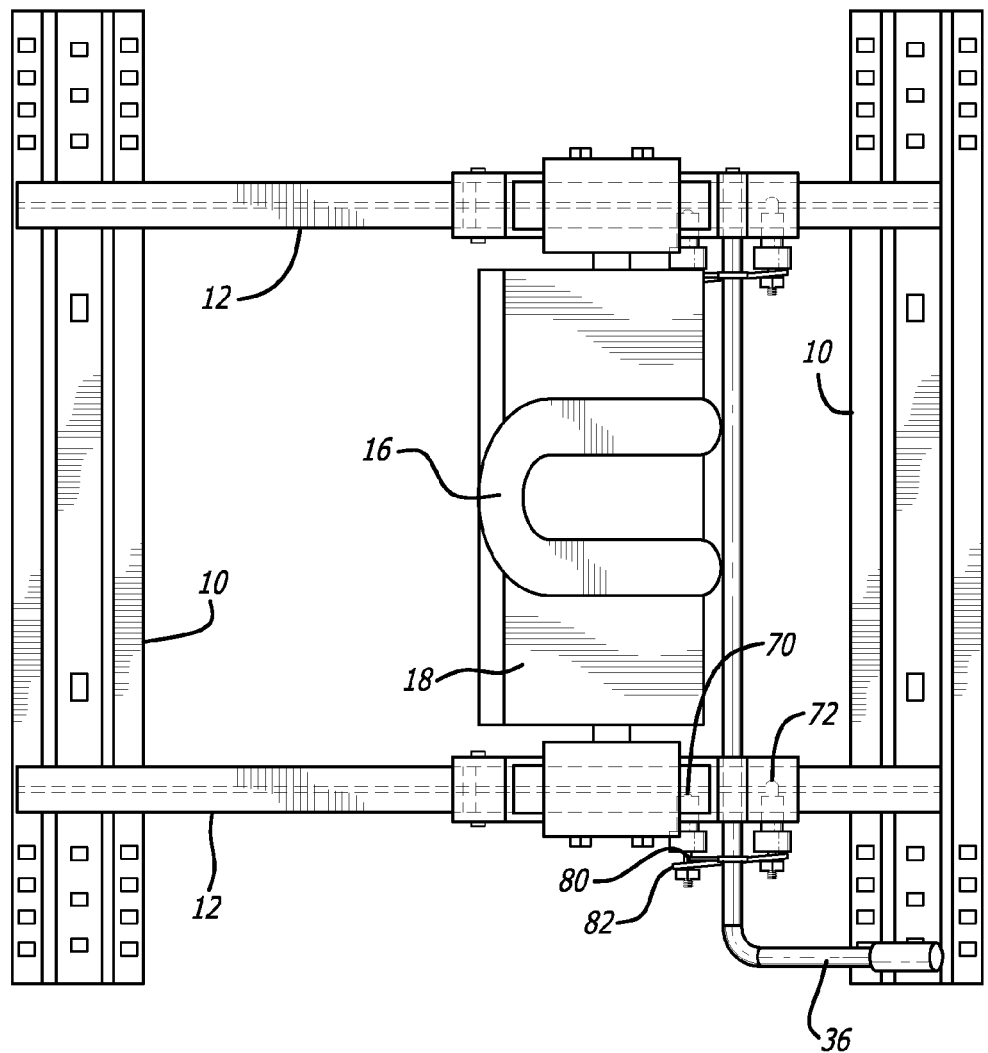
FIG. 15 is a top view of the embodiment of FIG. 8 is the furthermost locked position.

When the handle 36 is moved to the position shown in FIG. 12 and the pin 70 is no longer captured in the hole 48, the carriage 18 can slide along the slide rails in the direction shown by arrow 102. This movement of the carriage 18 is shown in FIG. 14, where the handle 36 has been moved to the rearward position and the assembly is manually pushed or driven in the direction of arrow 102 toward the rear position. The pin 72 continues to be biased outwardly by the spring 76, but can only extend far enough to bear against the web 52 of the slide rail 12. However, as shown in FIG. 15, when the carriage 18 reaches the point where pin 72 is aligned with hole 50, the spring 76 drives the pin through the hole 50, locking the carriage in the position shown in FIG. 15. Here, the pins 72 occupy the holes 50 fixing the carriage 18 to fix the carriage in the rear position. As long as the handle remains in the position shown in FIG. 15, the spring 76 will bias the pin 72 in the hole 50 and the fifth wheel assembly will be locked into the rear position.

To return the carriage back to the original position, the handle 36 is rotated back to the forward position shown in FIG. 9. As the handle 36 rotates, the lever 80 swings back across to engage the plate 82 near the pin 72. This forces the plate 82 to engage the lug 84 of the pin 72, pushing it away from the slide rail 12 as it compresses the spring 76 in the housing 74. As the lug 84, and thus the pin 72 is pushed away from the slide rail, the pin 72 exits the hole 50 freeing the carriage to slide back along the rails to its original position.

Because the pin 70 is now acting only on the influence of the spring 76, when it reaches the hole 48 the spring 76 will drive the pin 70 into the hole, locking the carriage in the forward position. Thus, the position of the handle frees either the pin 70 or the pin 72 to engage the holes 48, 50, respectively. Only by rotating the handle 36 can the engaged pin be withdrawn, thereby unlocking the carriage 18.

While illustrative exemplary embodiments of the invention have been described herein, the present invention is not limited to these embodiments, but includes any and all embodiments having modifications, omissions, combinations, adaptations and/or alterations, as would be appreciated by those skilled in the art based on the foregoing detailed description. The limitations in the claims are to be interpreted broadly based on the language employed in the claims, and not limited to the examples described in the foregoing detailed description, or during the prosecution of the application, which examples are to be construed as non-exclusive. For example, in the present disclosure, the term "preferably" is non-exclusive where it is intended to mean "preferably, but not limited to". Any steps recited in any method or process claims may be executed in any order and are not limited to the order presented in the claims. Means plus function or step plus function limitations will only be employed where for a specific claim limitation all of the following conditions are present in that limitation: (a) "means for" or "step for" expressly recited; and (b) a corresponding function is expressly recited. The structure, material or acts that support the means plus function are expressly recited in the description herein. Accordingly, the scope of the claims should be determined solely by the appended claims and their legal equivalents, rather than by the descriptions and examples given above.

I claim:

1. A glider hitch for fifth wheel assembly, comprising:
a pair of sliding rails each having at least a first aperture defining a forward position and a second aperture defining a rearward position, where the first apertures are aligned and the second apertures are aligned;
a fifth wheel mounting assembly for carrying a fifth wheel, the fifth wheel mounting assembly seated on first and second brackets adapted to slide along the sliding rails and each bracket includes a pin hole used to lock the fifth wheel assembly in place, the fifth wheel mounting assembly further including a locking rod with a positioning portion extending transversely across the sliding rails, the positioning portion including a pair of locking pins projecting toward the pin holes, the locking pins inserting into a respective first aperture on the sliding rails defining a forward position and the pin hole on the bracket to lock the fifth wheel mounting assembly in the forward position, and alternatively the first and second locking pins insert into a respective second aperture on the sliding rails defining a rearward position and the pin hole on the bracket to lock the fifth wheel mounting assembly in the rearward position, the positioning member further comprising biasing elements disposed on the positioning member for biasing the first and second locking pins in their respective apertures and pin holes, the locking rod further comprising a handle member for releasing the locking pins from their respective first and second apertures and locking holes on the bracket by applying a force opposite a force applied by the biasing elements;
wherein the sliding rails comprise beams having an "I" profile with horizontal top and bottom plates separated by a vertical main plate, and the fifth wheel mounting assembly includes first and second wheels that reside between the horizontal top and bottom plates for each sliding rail.

2. The glider hitch of claim 1, wherein the biasing elements are coil springs.

3. The glider hitch of claim 1, wherein the locking rod comprises first and second parallel plates that mount the locking pins, respectively.

4. The glider hitch of claim 1, wherein the handle member is substantially perpendicular to the positioning member.

5. The glider hitch of claim 1, wherein the positioning member is journalel in the fifth wheel assembly for rotation about a longitudinal axis.

6. A glider hitch for fifth wheel assembly, comprising:
a pair of sliding rails each having at least a first aperture defining a forward position and a second aperture defining a rearward position, where the first apertures are aligned and the second apertures are aligned;
a fifth wheel mounting assembly for carrying a fifth wheel, the fifth wheel mounting assembly seated on first and second brackets adapted to slide along the sliding rails and at least one bracket including a first aperture for locking the fifth wheel assembly in a first position, and a second aperture for locking the fifth wheel assembly in a second position, the fifth wheel mounting assembly further including a handle with a lever mounted thereon, lever selectively releasing a first spring actuated pin and withdrawing a second spring actuated pin when said handle is in a first orientation to lock the fifth wheel mounting assembly in said first position, and releasing the second spring actuated pin while withdrawing the first spring actuated pin while in a second orientation to lock the fifth wheel assembly in the second position;
wherein the sliding rails comprise beams having an "I" profile with horizontal top and bottom plates separated by a vertical main plate, and the fifth wheel mounting assembly includes first and second wheels that reside between the horizontal top and bottom plates for each sliding rail.

7. The glider hitch of claim 6, wherein the first and second spring actuated pins are disposed in respective housings.

8. The glider hitch of claim 6, wherein the handle rotates about a longitudinal axis from the first orientation to the second orientation.

9. The glider hitch of claim 6, wherein the lever engages a plate that is in contact with both the first and second spring actuated pins, and the plate engages one pin while disengaging one pin depending upon the position of the lever.

\* \* \* \* \*